United States Patent [19]
Priese et al.

[11] 4,014,514
[45] Mar. 29, 1977

[54] HIGH PRESSURE DIAPHRAGM VALVE

[75] Inventors: Werner K. Priese, Barrington; Wayne David Hayes, Mt. Prospect, both of Ill.

[73] Assignee: Hills-McCanna Company, Carpentersville, Ill.

[22] Filed: June 27, 1975

[21] Appl. No.: 591,175

[52] U.S. Cl. .................................. 251/331; 251/285
[51] Int. Cl.² ........................................... F16K 7/16
[58] Field of Search ........................... 251/331, 285

[56] References Cited
UNITED STATES PATENTS

| | | | |
|---|---|---|---|
| 2,381,544 | 8/1945 | Jacobsen | 251/331 |
| 2,659,565 | 11/1953 | Johnson et al. | 251/331 |
| 2,716,017 | 8/1955 | Linker | 251/331 |
| 3,175,473 | 3/1965 | Boteler et al. | 251/331 X |
| 3,250,511 | 5/1966 | Priese | 251/331 |
| 3,310,280 | 3/1967 | Boteler | 251/331 |
| 3,628,770 | 12/1971 | Rost | 251/331 |

*Primary Examiner*—Arnold Rosenthal
*Attorney, Agent, or Firm*—Olson, Trexler, Wolters, Bushnell & Fosse, Ltd.

[57] ABSTRACT

A closure-port type valve is constructed so as to minimize internal stresses and lengthen valve life. A limit plate is secured between a valve bonnet and a valve body; the limit plate halts motion of a diaphragm compressor as the compressor moves the diaphragm toward a valve-closed position. The limit plate and compressor are provided with surfaces which substantially completely support the diaphragm when the valve is fully opened. The limit plate and valve body seal and retain an outer diaphragm edge while achieving metal-to-metal contact, thereby preventing leakage and rocking movement which might otherwise be caused by repeated valve operation, or externally applied forces, such as overhung loads from actuators or seismic shocks.

15 Claims, 3 Drawing Figures

4,014,514

HIGH PRESSURE DIAPHRAGM VALVE

BACKGROUND OF THE INVENTION

This invention relates generally to flow regulating devices, and more particularly to industrial valves of a type wherein the flow of fluid is regulated by selectively positioning a flexible diaphragm relative to a stationary port opening in the valve assembly body. One such valve, which utilizes a flexible diaphragm selectively positionable relative to a stationary weir, is described and claimed in U.S. Pat. No. 3,250,511.

Modern valve design encourages the construction of low cost, effective, long-life valves which can be used in a wide variety of applications and under a wide variety of operating conditions. In industrial uses, fluid line pressures on the order of 300 PSIG or higher and temperatures in the range of 150° to 250° F. can be encountered. When valves are employed in the regulation of fluid flows in the nuclear power industry, component valve parts can be exposed to the effects of gamma radiation, which can degrade the performance and service life of some valve parts. Valve body and diaphragm parts may also be contacted and wetted by service fluids and gases, at least some of which can adversely affect the operation or service life of valve parts. In addition valves must withstand mechanical forces and shocks without damage or wear, and their continued proper operation must be assured for specified periods of time. These forces can be caused by high hydrostatic line pressure loads, thermal cyclic forces, seismic disturbance loads applied either directly to the valve itself or to parts or lines connected to the valve, and the like. Further difficulties are encountered when several of these forces act upon the valve so as to produce additive effects.

In an effort to promote safety and proper operating characteristics, construction codes and regulations now specify performance, service life and other parameters for valves and other components commonly used within the nuclear power industry. Implementation of these codes restricts the utility of some valves and other components widely used elsewhere, and presents additional problems for valve designers.

Experience with valves of this general sort has shown that repeated valve operation and elastomeric diaphragm compression "set" will occasionally cause the valve diaphragm to relax or rock loose; i.e., repeated flexing or relaxation motions of the diaphragm causes the diaphragm edge to pull away from its position relative to seating or restraining portions of the valve assembly, thereby causing premature valve leakage, and potential valve failure by unacceptable outleakage to the atmosphere.

Many of these problems can be ameliorated if not entirely overcome by providing a valve in which internal stress intensity levels are reduced or eliminated in component parts and part assemblies. To this end, the major internal stresses are encountered when the valve is in the open condition and the diaphragm is subjected to the line pressure. With the present invention the valve housing and diaphragm compressor are designed to provide full and complete support over substantially the entire area of the diaphragm. Accordingly, any danger of the diaphragm ballooning outwardly and being cut or damaged by sharp corners or edges on the valve components is precluded. Also, the diaphragm of the present invention is molded in the valve open condition, clearly reducing internal stresses when the diaphragm encounters high line pressure while in service.

It thus is the general object of the present invention to provide a new and improved diaphragm type valve which is designed and arranged to provide relatively reduced stress intensity levels in its component parts.

Another object of the invention is to provide a low-stress valve mechanism which positively prevents overclosure and crushing of the resilient valve diaphragm when the diaphragm is moved into a valve-closed position.

Yet another object of the invention is to provide a low-stress valve mechanism of the type described which can be used with a handwheel-operated valve or with a valve having alternative mechanisms for valve operations.

It is another specific object of the invention to provide a low-stress valve construction which will prevent rocking motion of the flexible diaphragm from ultimately working the valve diaphragm periphery out of or away from its proper seat on retaining valve parts, thereby loosening the diaphragm and causing premature valve failure.

Another object of the present invention is to provide a new and improved diaphragm type valve which will provide extended service life under the conditions described, yet which can be provided at an attractive commercial cost.

Other objects and advantages of the invention will become apparent upon reading the following detailed description and upon reference to the drawings. Throughout the description, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
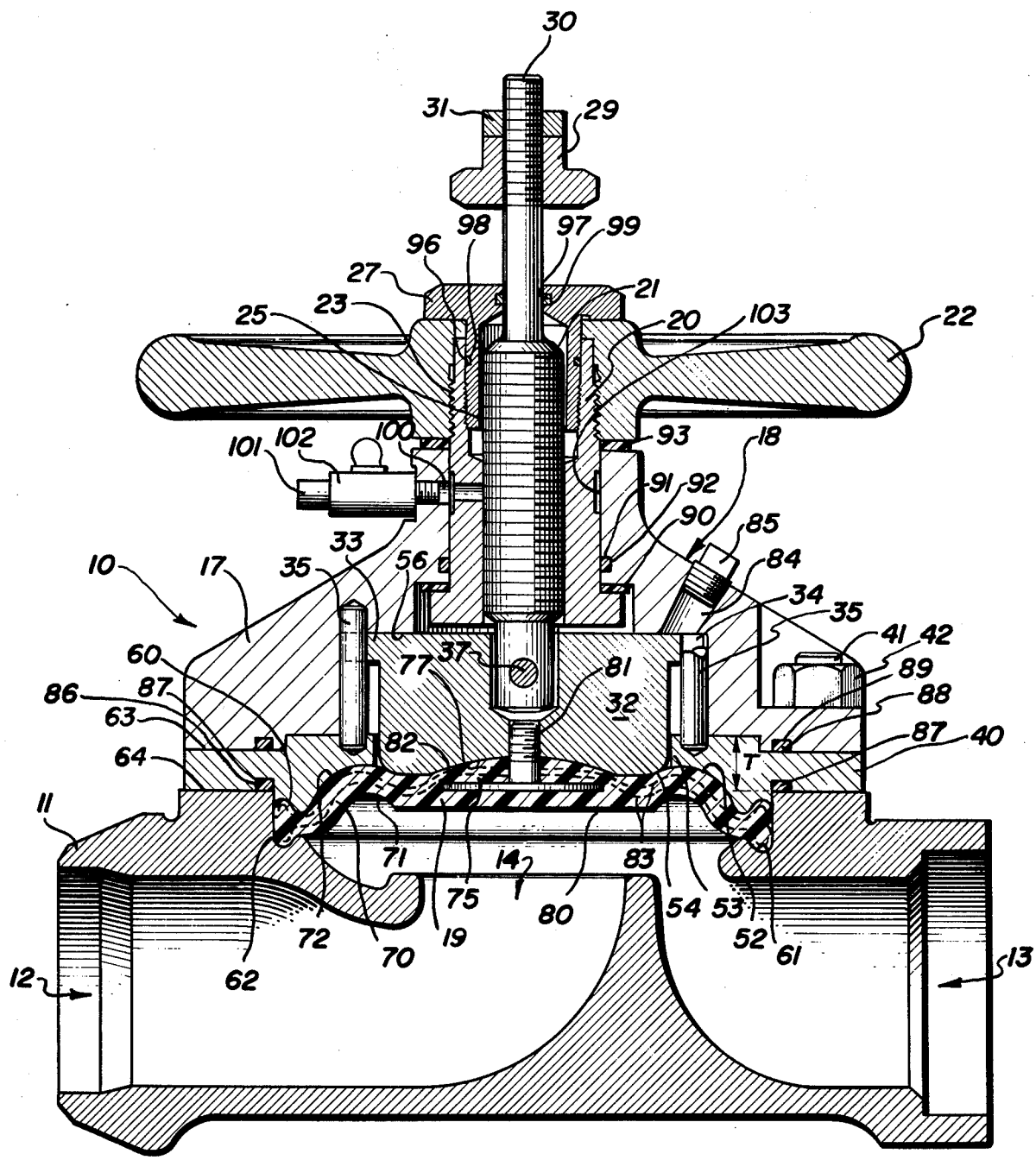
FIG. 1 is an elevational view in section showing a valve embodying the present invention as it appears when the valve parts are in their fully opened condition.

Turning first to FIG. 1, there is shown a valve 10 embodying the present invention. Speaking generally, this valve can be considered to include a valve body 11 having an inlet port 12 and outlet port 13. Fluid flowing through the inlet port 12 passes through a communicating circular opening defined by a stationary closure port 14 and thence to the outlet port 13. When fluid flows through the valve in the directions described, effective portions of the diaphragm are fully supported by back-up structure when the valve is either fully opened or fully closed; this feature of the invention leads to increased trouble-free valve operating life.

Mounted atop the valve body 11 is a bonnet housing 17, and fixed thereon is an assembly 18 used to open and close the valve by moving a flexible diaphragm 19 into and out of sealing, flow-halting engagement with the closure port 14.

Here, this assembly 18 includes a rotatable sleeve 20 adapted to threadably engage a rising stem 21 which is secured against rotation as described below, but which can undergo axial motion toward and away from the closure port 14.

A hand wheel 22 is affixed, as by means of mating threads 23, to the sleeve 20. When the hand wheel 22 and cooperating sleeve 20 are rotated, the rising stem 21 is urged axially upwardly or downwardly as appropriate by the interaction of mating threads 25 formed upon the rising stem 21 and the interior of the sleeve 20.

To provide an adjustable valve-closed stop, a stop collar 29 is threadably attached to a rising stem extension 30. This stop collar 29 can be secured in a predesignated axial location upon the rising stem extension 30 as by a jamb nut 31. When the handwheel is appropriately rotated and the rising stem forced axially downwardly from the position indicated in FIG. 1 toward the position shown in FIG. 3, the stop collar 29 moves downwardly with the rising stem extension 30 and engages a handwheel retainer 27, thereby prohibiting further downward axial motion of the rising stem 21. This arrangement permits a relatively closed valve configuration to be selected and adopted for a particular valve. If desired, this valve-closed condition can be a throttling configuration permitting a relatively minor but positive amount of fluid flow through the valve; it need not necessarily be a completely valve-closed configuration. It will be understood that other valve operating mechanisms could be provided without departing from the scope of this invention.

Figure 2:
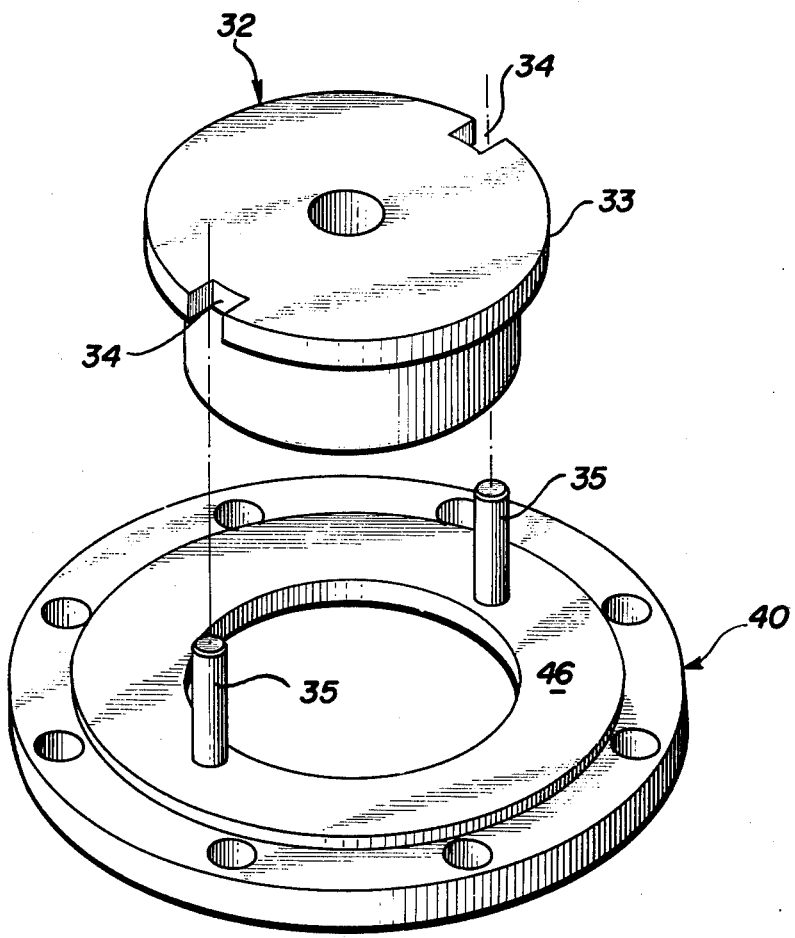
FIG. 2 is an exploded view showing in further detail several of the parts shown in FIG. 1.
Figure 3:
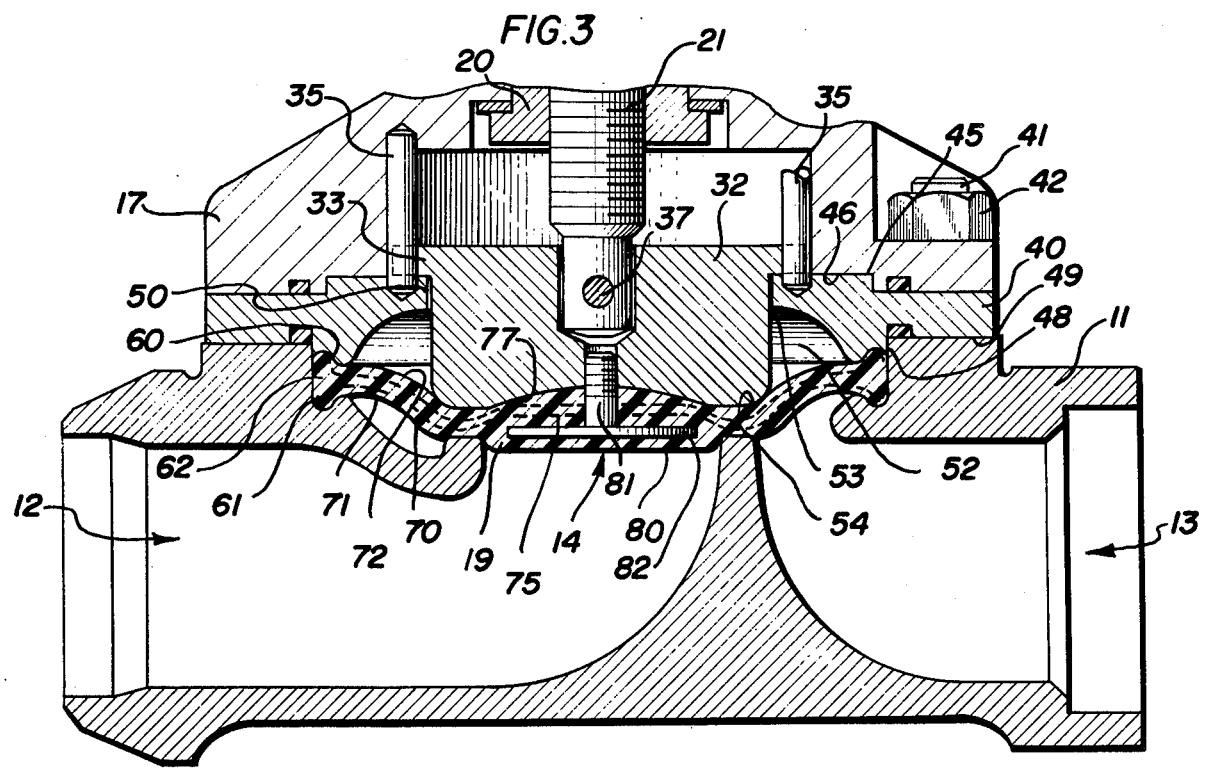
FIG. 3 is a sectional view similar to FIG. 1 but showing the valve part as it appears when the valve parts are in their fully closed condition.

Carried for reciprocal motion between the valve-opened position shown in FIG. 1 and the valve-closed position shown in FIG. 3 is a compressor member 32. This compressor 32 is inhibited from rotation within the valve. To this end, the compressor which is best viewed in FIG. 2, is provided with a top flange portion 33. Cutouts 34 in the flange 33 are adapted to mate with pins 35 fixed within the bonnet housing 17 and other parts of the assembly 18. A cross pin 37 fixed within a portion of the rising stem 21 engages with the compressor member 32 joining these components and acutating the compressor 32 as the stem 21 axially reciprocates relative to other portions of the valve.

In accordance with one aspect of the invention, the diaphragm 19 is precluded from being over-compressed when the valve parts are positioned to fully close the valve as shown in FIG. 3. To this end, an annular limit plate 40 is secured between the valve bonnet 17 and the valve body 11, as by threaded studs 41 and retaining nuts 42. This limit plate 40 is centered in a predesignated position relative to the valve bonnet, as by a noncompressive annular shoulder 45 formed upon a top surface 46 of the limit plate. A second noncompressive annular shoulder centering structure 48 is provided on a bottom surface 49 to center the limit plate relative to the valve body 11. A central passage hole 50 permits at least partial passage of the compressor 32 through the limit plate 40 as it moves toward and away from the closure port 14.

In carrying out this aspect of the invention, it is to be noted that the limit plate upper surface 46 extends toward the compressor 32 sufficiently to permit the compressor flange 33 to engage this upper stop surface 46. By appropriately selecting the depth or thickness T of the limit plate 40, and thus locating the upper surface 46 at a predetermined distance from the closure port 14, the motion of the compressor 32 toward the closure port 14 can be halted at a predetermined distance from the closure port. This abuttive stop prevents excessive crushing of the diaphragm 19 which is interposed between the closure port 14 and the compressor 32. In practice, diaphragm compression set, service temperature, valve line pressure and diaphragm configuration are taken into account in determining how far the compressor should by allowed to travel toward the closure port 14 so as to provide an effective, compressive sealing force when the compressor 32 urges the diaphragm 19 against the port 14. It will also be understood that externally applied forces, such as seismic shock or the weight of an overhung valve actuator can be accommodated without introducing shear loads on the studs 41 or deleterious forces and conditions inside the valve, by virtue of annular shoulders 45 and 48.

It is another feature of the invention that full support for the diaphragm 19 is provided when the diaphragm 19 and other valve parts are located in the valve fully opened position illustrated in FIG. 1. To this end, the limit plate 40 is provided with a lower first annular concave surface 52 which is adapted to abuttively support an expanded or bulbous diaphragm shoulder portion. Diaphragm support is provided without straining the diaphragm by aligning the radially interior edge 53 of this concave surface 52 with a lower shoulder 54 of the compressor 32 when the compressor 32 and diaphragm 19 are fully retracted into a valve fully opened position such as that shown in FIG. 1. The compressor 32 and limit plate 40 thus provide a substantially continuous and completely abuttive and supportive structure for the diaphragm 19 when the compressor and diaphragm are fully retracted into a valve opened position, as shown in FIG. 1. This structure resists fluid flow force at high line pressures and eliminates any tendency for the diaphragm to balloon into the valve top works. With prior art valve designs, ballooning can occur, and since the diaphragm is in a stretched or tensile condition when ballooned outwardly, any sharp corner that may exist will easily cut or damage the diaphragm surface, thereby reducing its service life.

In the condition as shown in FIG. 1, the compressor 32 abuts an upper stop surface 56 formed in the housing 17, but does not compressively act against the sleeve 20 or rising stem 21. This construction distributes internal valve forces created by hydrostatic line load over a broad area when the valve is fully opened. As the compressor 32 does not engage sleeve 20 or stem 21, the amount of operating break force required to move the valve parts out of their fully opened positions is reduced.

In accordance with another feature of the invention, a valve structure is provided to assure a primary pressure retaining seal, to inhibit the diaphragm rocking phenomena described above, and to assist in retaining the diaphragm in its designed location within the valve. To this end, the limit plate is provided with a second concavity 60. A corresponding but generally opposed concavity 61 is formed at an opposite position within the valve body 11. Together, these concavities define a relieved annular volume to accept an axially enlarged annular diaphragm outer edge section 62 and retain said diaphragm edge section 62 and diaphragm 19 itself in position. Also as can be seen in FIG. 1 the limit plate 40 includes an annular extension which defines upper and lower surfaces 63 and 64 and are in effect clamped between the bonnet housing 17 and the valve body 11. As such, the respective valve parts do not depend upon engagement with the resilient diaphragm for stability; but rather are in firm metal-to-metal contact, which precludes any tendency of the valve elements to rock, which could result in leakage. As will be detailed hereinafter, seals 87 and 88 are provided to prevent against leakage along surfaces 63 and 64.

Further, even though the valve assembly parts are secured together with relative firmness, excessive force is not applied to the diaphragm 19 itself. Rather, the particular configuration of the diaphragm and surrounding limit plate and valve body parts are utilized to secure and seal the diaphragm in its designed location within the valve. This lipped, registered, metal-to-metal interfitment of the housing 17, limit plate 40, and body 11 prevents "rocking" the diaphragm 19 and the attendant possibility of valve failure.

To lessen stresses within the diaphragm in accordance with the invention, an annular mediate diaphragm section 70 is partially defined by a concave lower diaphragm surface 71 and a convex upper diaphragm surface 72 which rises at least level with adjacent diaphragm portions to define a diaphragm shoulder. When constructed as illustrated in FIGS. 1 and 3 and described here, this mediate section 70 provides a radially measured reserve of diaphragm material permitting the diaphragm 19 itself to be urged into a fully closed position by the compressor 32 without creating tensile strain within any portion of the diaphragm. In this regard, compare FIGS. 1 and 3, and please note that surface portion 72 is not stretched in the closed condition, but remains convex in shape.

A third or inner section of the diaphragm 19 is provided with an upper surface conforming to the face 77 of the compressor 32. A substantially planar lower diaphragm surface 80 is formed so as to be larger than the opening defined in the associated valve closure port 14. Thus, the inner section 75 provides a complete, planar, flow-halting valve seat when the diaphragm is forced into a valve-closed position and the planar surface 80 of the inner section 75 is forced into sealing engagement with the valve closure port 14.

In carrying out the invention, the diaphragm is molded in the valve-open configuration shown in FIG. 1. This construction permits the diaphragm to experience minimal internal stresses and strains when the valve is fully opened.

A stud 81 projects from the center of the diaphragm 19 and is threaded to mate with a bore in the compressor 32 to provide cooperative motion between the diaphragm and compressor. To distribute forces applied to the stud 81 throughout the diaphragm 19, the stud terminates in an expanded foot 82 encased within and bonded to the diaphragm. Additional stress resistance and diaphragm service life can be obtained by including one or more fabric reinforcing webs 83 bonded within the diaphragm. A drilled and tapped hole 84 is filled with a vent plug 85 to allow periodic checks of diaphragm integrity.

This valve can be effectively sealed against leaks even when it is used under difficult operating conditions. A recessed seat 86 formed in the limit plate 40 receives a seal 87 of the O-ring type to further prohibit leakage between the valve body and limit plate 40; primary sealing is, of course, accomplished by the diaphragm 19. A similar seat 88 in the housing 17 accepts an O-ring type seal 89 to further prohibit leakage between the valve body and limit plate. Between the sleeve 20 and housing 17, a thrust washer or bearing 90 and a seal 91 are provided, the seal 91 being of the O-ring type and carried in a recessed seat 92. A second thrust washer 93 is carried around the sleeve 20 and between the housing 17 and handwheel 22. Two small O-ring type seals 96 and 97 are carried in recessed seats 98 and 99 respectively formed in the hand wheel retainer 27 prohibit leakage at the valve top.

To ease valve operation, the rising stem 21-sleeve 20 interface is lubricated. Suitable lubricant can be forced through a bore 100 in the sleeve 20, as by a threaded plug 101 which is secured by a fitting 102 of desired type. Uniform lubrication is encouraged by a recess 103 leading from the bore 100 around the stem 20.

In constructing the valve, the diaphragm may be formed of elastomeric compounds compatable with the fluids to be encountered during service, and can include polymer compounds of ethylene propylene (EPDM or EPM) and the like. Compounds sold under such trade names as "Nordel", "Vistalon", "Neoprene", "Nitrile", "Hypalon", "Viton", "Natural Rubber" and others have been found suitable in various service applications.

Valve body and topwork metal parts may be made of appropriate grades of carbon steel, stainless steel and like materials; choices are sometimes dictated by the codes and regulations referred to above. Seals can also be formed from ethylene propylene rubbers. Effective lubricants which do not degrade the service life of other valve components include silicone greases such as that sold under the trade name "Versilube" and others.

The invention is claimed as follows:

1. In a valve comprising a valve body defining inlet and outlet ports and a closure port communicating therewith, a valve bonnet fixed on the valve body over the closure port, a compressor reciprocable toward and away from the closure port, a flexible diaphragm overlying the closure port and movable by the compressor into engagement with the closure port to block fluid flow through the closure port and alternatively movable away from the closure port to permit progressively greater fluid flow through the closure port, the improvement comprising an annular limit plate secured between the valve bonnet and the valve body, the plate including first non-compressive centering means for centering the limit plate relative to the valve bonnet, second non-compressive centering means for centering the limit plate relative to the valve body, central passage means permitting at least partial passage of the compressor through the plate, an upper surface positioned for abutting engagement of compressor stop means to halt motion of the compressor toward the closure port at a predetermined distance from the closure port so as to prevent excessive crushing of the diaphragm interposed between the closure port and the compressor, and a lower surface having a first concavity adapted to abuttively support a bulbous diaphragm shoulder portion, the radially interior edge of the first concavity being substantially aligned with the shoulder of the compressor when the compressor and diaphragm are fully retracted into a valve fully opened position, the compressor and limit plate thus providing a substantially completely abuttive and supportive structure for the diaphragm when the compressor and diaphragm are fully retracted into a valve fully opened position.

2. In a valve according to claim 1, the improvement comprising: a second concavity opposed to but spaced from an annular concavity in the valve body, the limit plate second concavity and the valve body concavity together defining a relieved annular volume to accept an enlarged annular diaphragm edge section, thereby forming a primary line pressure-containing seal within the valve and retaining the diaphragm edge section and diaphragm in the valve against rocking dislodgement caused by repeated valve operation or other externally applied forces.

3. In a valve comprising a valve body defining inlet and outlet ports and a closure port communicating therewith, a valve bonnet fixed on the valve body over the closure port, a compressor reciprocable toward and away from the closure port, a flexible diaphragm overlying the closure port and movable by the compressor into engagement with the closure port to block fluid flow through the closure port and alternatively movable away from the closure port to permit progressively greater fluid flow through the closure port, the improvement comprising an annular limit plate secured between the valve bonnet and the valve body, the plate including first non-compressive centering means for centering the limit plate relative to the valve bonnet, second non-compressive centering means for centering the limit plate relative to the valve body, central passage means permitting at least partial passage of the compressor through the plate, an upper surface positioned for abutting engagement of compressor stop means to halt motion of the compressor toward the closure port at a predetermined distance from the closure port so as to prevent excessive crushing of the diaphragm interposed between the closure port and the compressor, and a lower surface having a second concavity opposed to but spaced from an annular concavity in the valve body, the limit plate second concavity and the valve body concavity together defining a relieved annular volume to accept an enlarged annular diaphragm edge section thereby forming a primary line pressure-containing seal within the valve and retaining the diaphragm edge section and diaphragm in the valve against rocking dislodgement caused by repeated valve operation or other externally applied forces.

4. A valve according to claim 1 wherein said first non-compressive centering means includes an annular shoulder formed upon said limit plate, and wherein said second non-compressive centering means includes an annular shoulder formed upon an opposite plate surface for collectively centering said valve body, said limit plate, and said valve bonnet without inducing valve stresses under the influence of externally applied force loads.

5. A valve comprising a valve body defining inlet and outlet ports and a closure port communicating therewith, a valve bonnet fixed on the valve body over the closure port, a compressor reciprocable toward and away from the closure port, a limit plate secured between the valve bonnet and the valve body, limit plate central passage means permitting at least partial passage of the compressor through the limit plate, an upper surface positioned for abutting engagement of the stop means mounted on the compressor to halt motion of the compressor toward the closure port at a predetermined distance from the closure port, the limit plate further including a lower surface having first and second concavities, a diaphragm including an annular outer edge section axially enlarged relative to radially adjacent diaphragm portions and providing both outwardly and inwardly directed diaphragm surfaces adapted to engage the limit plate first concavity and a complementary but generally opposed concavity formed in the valve body so as to retain the edge section and diaphragm itself in the valve against rocking dislodgement, an annular mediate section partially defined by a concave lower diaphragm surface and a convex upper diaphragm surface when the diaphragm is unstrained by outside forces, the upper surface rising at least level with adjacent diaphragm portions to define a shoulder portion, whereby the mediate section provides a radially measured reserve of diaphragm material permitting the diaphragm to be urged into a fully closed position without creating tensile strain in the mediate section, and an inner section having an upper surface conforming to the face of the associated compressor and a substantially planar lower surface larger than the valve closure port whereby the inner section provides a complete, planar, flow-halting seat when the diaphragm is forced into a valve-closed position and the inner section planar surface is forced into seating engagement with the valve closure port.

6. A valve according to claim 5 wherein said diaphragm is molded in a valve-open position.

7. A valve according to claim 5 including attachment stud means secured partially within said diaphragm for attaching the diaphragm inner section to said compressor.

8. A valve according to claim 5 wherein said diaphragm mediate portion convex upper surface is formed to abut said limit plate first concavity when said diaphragm is located in a valve-fully-opened position to provide substantially full diaphragm support when said valve is fully opened.

9. A valve according to claim 8 including a compressor abutment surface in said valve bonnet positioned to engage said compressor in its upward travel and halt the upward motion of the compressor in a predetermined position such that the compressor face adjacent the diaphragm and said limit plate first concavity are substantially aligned, whereby to provide substantially complete structural support for said diaphragm when the valve is in its valve-fully-opened position.

10. In a valve comprising a valve body defining inlet and outlet ports and a closure port communicating therewith, a valve bonnet fixed on the valve body over the closure port, a compressor reciprocable toward and away from the closure port, a flexible diaphragm overlying the closure port and movable by the compressor into engagement with the closure port to block fluid flow through the closure port and alternatively movable away from the closure port to permit progressively greater fluid flow through the closure port, the improvement comprising an annular limit plate secured between said valve bonnet and said valve body against which said compressor engages to limit movement thereof, said limit plate and said valve body including means to receive and retain an annular enlarged edge of said diaphragm, inwardly of the periphery of said limit plate, said limit plate including an annular extension which defines the periphery thereof, which extension is clamped between said valve body and said bonnet thereby to preclude rocking of said valve components, while firmly retaining said diaphragm in position.

11. In a valve comprising a valve body defining inlet and outlet ports and a closure port communicating therewith, a valve bonnet fixed on the valve body over the closure port, a compressor reciprocable toward and away from the closure port, a flexible diaphragm overlying the closure port and movable by the compressor into engagement with the closure port to block fluid flow through the closure port and alternatively movable away from the closure port to permit progressively greater fluid flow through the closure port, the improvement comprising a limit plate defining an annular concavity and disposed in close proximity to said compressor, said diaphragm being molded in the valve-open condition with a bulbous, convex portion conforming to and disposed in said annular concavity in said limit plate, such that when said valve is in the valve-open condition, said diaphragm will be substantially totally supported on the surface opposite that exposed to the fluid media in said valve, with said bulbous, convex portion enabling said diaphragm to be moved to the valve-closed position without producing tensile stress in said diaphragm material.

12. The combination as defined in claim 11, wherein said diaphragm includes an enlarged edge portion, and said limit plate and said valve body include means defining a recess for reception and retention of said edge portion.

13. The combination as defined in claim 12, wherein said limit plate includes upper and lower surface portions engaged by said valve bonnet and said valve body, respectively, in clamping engagement to preclude rocking of said valve components.

14. The combination as defined in claim 10 wherein said diaphragm includes an edge portion adapting said diaphragm to be retained in operating position, an annular mediate diaphragm section of a generally bulbous configuration defined by a concave lower surface and a convex upper surface, said annular mediate portion surrounding a central portion including means adapting said diaphragm for connection to said reciprocal compressor and including a lower surface designed to seat upon said closure port, said diaphragm being molded in the valve-open condition such that upon movement from said valve-open condition to the valve-closed condition, said annular, mediate portion can flex without the introduction of internal tensile stresses.

15. A diaphragm as defined in claim 14, wherein said edge portion includes an enlarged segment adapted for receipt in a recess formed by valve components to effect retention of said diaphragm during use.

* * * * *